S. L. CLARK.
MOLD FOR FENCE POSTS.
APPLICATION FILED FEB. 21, 1913.
1,073,471.
Patented Sept. 16, 1913.
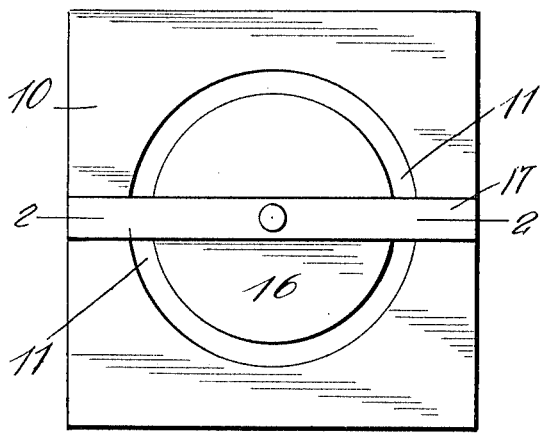
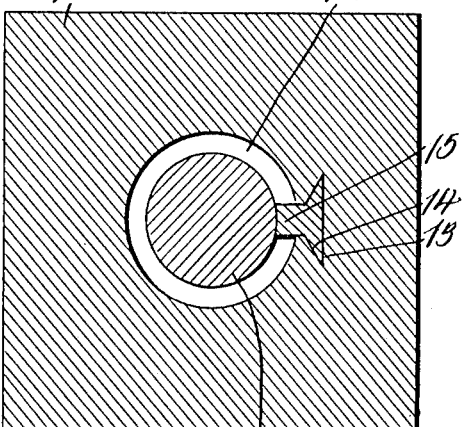
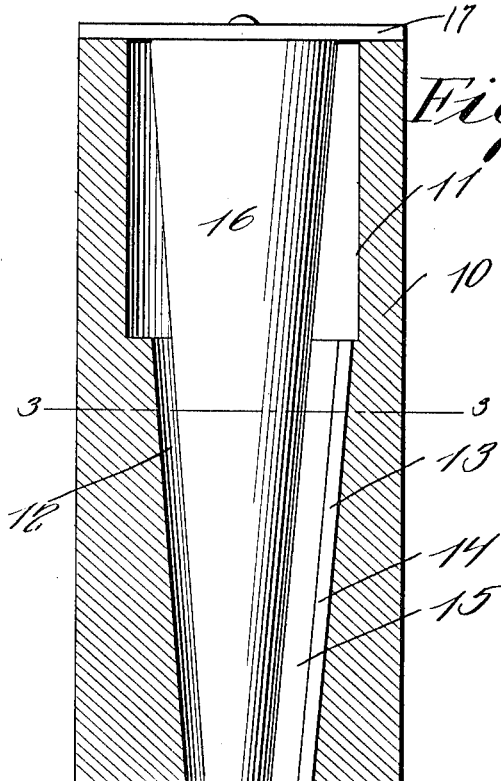
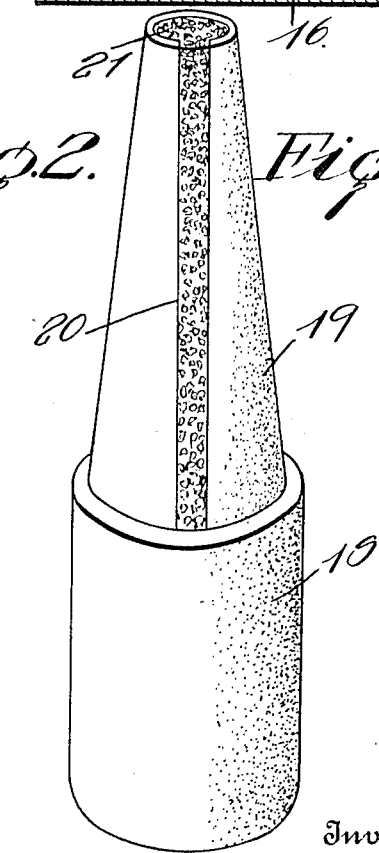
Witnesses
Inventor
S. L. Clark
By
Attorneys

UNITED STATES PATENT OFFICE.

SPENCER L. CLARK, OF HALE, MICHIGAN.

MOLD FOR FENCE-POSTS.

1,073,471.

Specification of Letters Patent.   Patented Sept. 16, 1913.

Application filed February 21, 1913.   Serial No. 749,997.

*To all whom it may concern:*

Be it known that I, SPENCER L. CLARK, a citizen of the United States, residing at Hale, in the county of Iosco, State of Michigan, have invented certain new and useful Improvements in Molds for Fence-Posts; and I do hereby declare the following to be a full, clear, and exact description of the invention, such as will enable others skilled in the art to which it appertains to make and use the same.

This invention relates to improvements in artificial stone posts, and the method employed in making same.

The principal object of the invention is to provide a simple artificial stone post having a wooden portion to which the fence wires may be nailed, and the peculiar manner in which the wooden portion of the post is formed.

Other objects and advantages will be apparent from the following description and with particular reference to the accompanying drawings.

In the drawings: Figure 1 is a top plan view of my mold used in forming the posts. Fig. 2 is a vertical longitudinal section on the line 2—2 of Fig. 1. Fig. 3 is a transverse section on the line 3—3 of Fig. 2. Fig. 4 is a perspective view of the finished post.

Referring particularly to the drawings, 10 represents the outer casing of the mold, in the upper portion of which is formed a straight bore 11, said bore extending a distance down into the mold sufficient to form the base of the post. Extending from the lower end of the straight bore 11 is a downwardly tapering bore 12, which extends to the bottom of the mold. In one wall of the tapering bore is formed a dove-tailed groove 13, running the entire length of the said bore, and into which is placed a dove-tailed strip 14, having on one side the rib 15. This rib 15, when the strip is seated within the groove is adapted to project into the bore. A conical member 16 is provided for insertion within the mold, said member being of a length equal to the length of the mold casing 10.

In molding a post with my mold, the strip 14 is positioned in the groove, and the conical or tapering bore as well as the straight bore is filled with plastic material, or rather partially filled when the conical member 16 is inserted therein, the point inserting itself in the plastic material at the bottom of the mold. A suitable brace 17 is provided at the top of the mold for engagement with the upper end of the conical member 16 to hold the said member in a centered position, so that the post will be of equal thickness in all parts of its circumference. The rib portion 15 of the strip 14 projecting into the tapered cavity forms a vertical opening in one side of the tapered portion of the post, the purpose of which will be referred to later.

After the plastic material has become slightly set, the conical member 15 is removed from the mold, and the cavity within the plastic material is then filled with sawdust or the like and clamped down under heavy pressure, so that the material will be highly compressed into a solid mass. It will be noted that the tongue 15 forms an opening in one side of the tapered portion of the post, and when the sawdust is packed into the cavity of the post, said sawdust will extend out into the opening, so that nails or staples may be readily driven thereinto to hold wires to the post.

In Fig. 4 there is shown a view of a completed post which comprises the cylindrical base portion 18, and the upwardly tapering post portion proper 19, in which is formed the elongated opening 20, through which staples or nails may be driven into the interior packing, and sawdust 21.

From the foregoing it will be seen that I have provided a simple post which combines the features of the artificial post which is proof against decay, and has the advantage of the wood post, in that wires may be readily nailed thereto.

What is claimed is:

A mold for fence posts comprising a casing having a cylindrical bore in the upper portion and a tapering bore in the lower portion, one wall of said tapering bore being provided with a longitudinal dove-tailed slot, a removable dove-tailed strip seated within the groove and having an outwardly projecting longitudinal rib formed thereon, said rib projecting into the tapered cavity, and a conical member seated within the mold casing to form a cavity the entire length of the post, the rib of said strip forming an elongated opening vertically in the tapered portion of the post.

In testimony whereof, I affix my signature, in the presence of two witnesses.

SPENCER L. CLARK.

Witnesses:
  VICTORIA NUNN,
  ANNA KELLY.